United States Patent [19]

Hukki et al.

[11] Patent Number: 5,032,210
[45] Date of Patent: Jul. 16, 1991

[54] APPARATUS FOR THE MANUFACTURE OF TENSION SCREENS

[75] Inventors: Ari M. Hukki, Edgewood, Ky.; Gerald P. Salladin, Buena Park, Calif.

[73] Assignee: Sweco Incorporated, Florence, Ky.

[21] Appl. No.: 574,658

[22] Filed: Aug. 29, 1990

Related U.S. Application Data

[62] Division of Ser. No. 237,102, Aug. 26, 1988, Pat. No. 4,968,366.

[51] Int. Cl.$^5$ ............................................. B32B 31/04
[52] U.S. Cl. .................................. 156/359; 156/379.9; 156/380.9; 156/494; 156/499
[58] Field of Search ............ 156/499, 494, 359, 380.9, 156/379.9; 209/403, 405; 219/443, 459, 460, 478, 521

[56] References Cited

U.S. PATENT DOCUMENTS

| | | | |
|---|---|---|---|
| 2,194,551 | 3/1940 | Holman | 140/109 |
| 2,228,332 | 3/1938 | Wick et al. | 154/2 |
| 3,109,367 | 11/1963 | Walkup et al. | 156/359 X |
| 3,193,424 | 7/1965 | Scott | 156/73 |
| 3,214,314 | 10/1965 | Rowbottam | 156/160 |
| 3,243,042 | 3/1966 | Moulton | 209/403 |
| 3,341,013 | 9/1967 | Moulton | 209/403 |
| 3,369,662 | 2/1968 | Rohner | 209/403 |
| 3,397,633 | 8/1968 | Harris | 156/359 X |
| 3,792,774 | 2/1974 | Rosenblum | 209/403 X |
| 3,875,065 | 4/1975 | Rosenblum | 209/403 X |
| 3,915,775 | 10/1975 | Davis | 156/160 |
| 4,028,230 | 6/1977 | Rosenblum | 209/403 |
| 4,568,455 | 2/1986 | Huber et al. | 209/405 |
| 4,582,597 | 4/1986 | Huber | 209/405 X |

FOREIGN PATENT DOCUMENTS 296273 6/1987 European Pat. Off. .

Primary Examiner—Michael W. Ball
Assistant Examiner—Jeff H. Aftergut
Attorney, Agent, or Firm—Lyon & Lyon

[57] ABSTRACT

A screen assembly, the process for its manufacture, the apparatus used in the process and an adhesive presenting a system and the final product for accurately tensioned bonded screens. The screens include a screen frame and screen cloth bonded thereto by adhesive using bisphenol F epoxy resin, amine adduct hardener, a substantial percentage of amorphous silica and small amounts of glycerin and fumed or precipitated silicon dioxide. Titanium dioxide may also be employed for color. A screen assembly apparatus includes a screen cloth tensioning frame and a platform positionable adjacent a tensioned screen cloth. The platform includes heating elements about the periphery of a sheet heater on a lift table. The heating elements receive a screen frame which can be lifted into contact with a screen cloth in the tensioning frame. The sheet heater approaches the screen cloth itself. A thermal control cycle is presented which allows the screen frame to cool prior to the tensioned screen. Blowers enhance the cooling process of the screen frame. Resilient devices are provided to maintain tension in the screen cloth irrespective of heat expansion and to maintain a uniform pressure of the peripheral heating elements against the screen frame and in turn against the screen cloth.

17 Claims, 2 Drawing Sheets

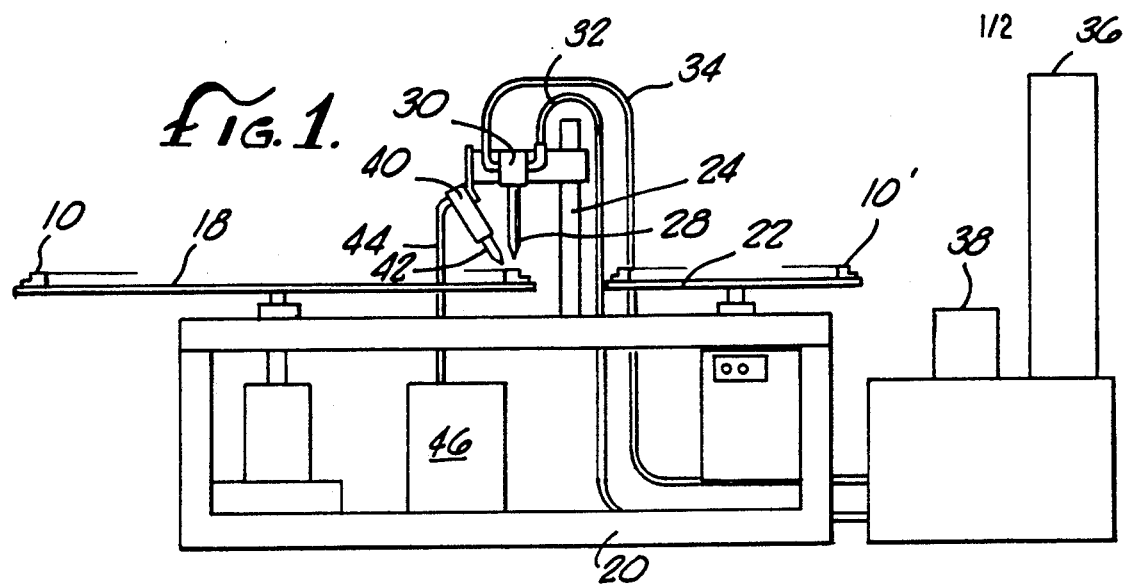
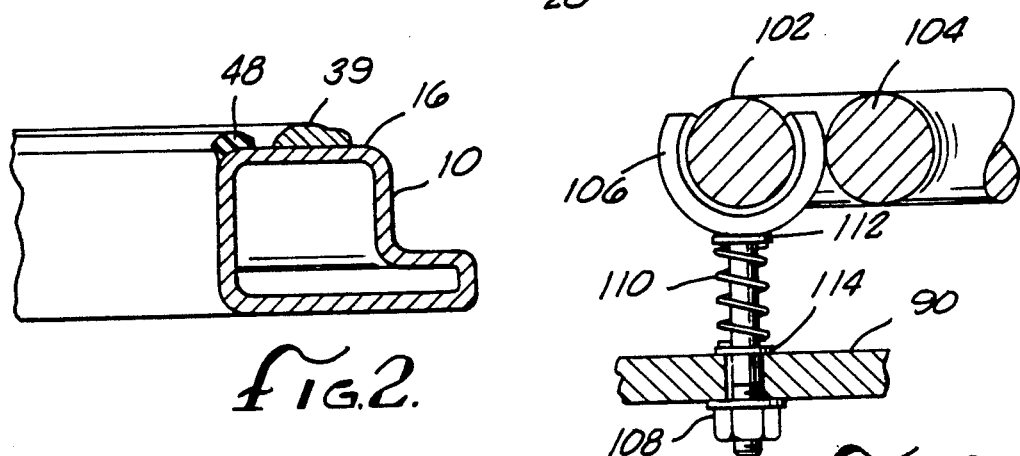
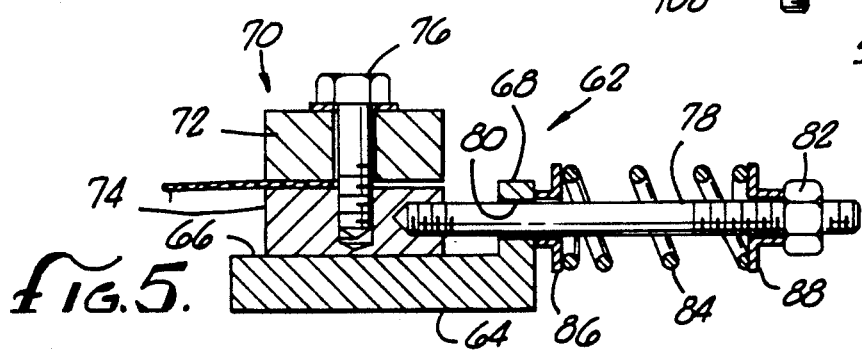
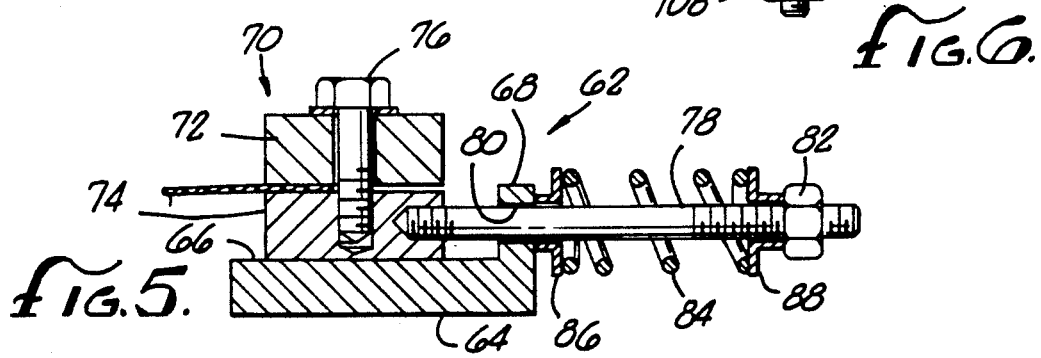
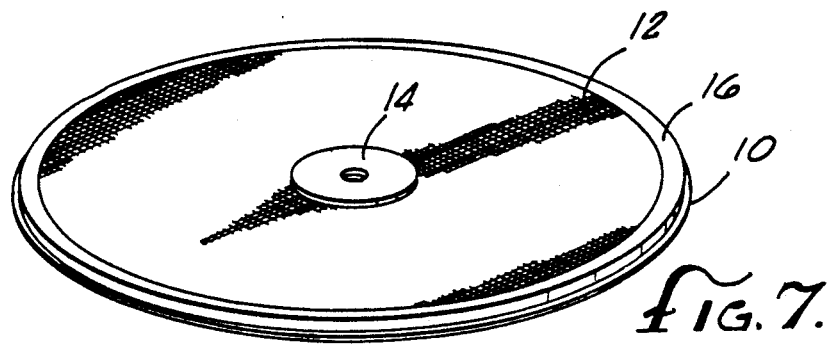

APPARATUS FOR THE MANUFACTURE OF TENSION SCREENS

This is a division of application Ser. No. 237,102, filed Aug. 26, 1988, now U.S. Pat. No. 4,968,366.

BACKGROUND OF THE INVENTION

The field of the present invention is apparatus for the manufacture of screens which are tensioned for use in separating and the like.

Metal screen cloth as well as many other suitable materials have long been employed in tensioned conditions for the processing of materials, the stripping of liquids and the like. Such tensioned screens often include both the screen cloth and a structural screen frame to which the screen cloth is strongly attached. The attachment of the tensioned screen cloth to the screen frame has conventionally taken many forms including mechanical interlocking elements, upper and lower frame elements either welded or bonded together with the screen in between and simple bonding of screen cloth to a screen frame without additional mechanical restraint.

A primary difficulty which has been encountered in the manufacture of such tensioned screens has been the maintenance of appropriate tension in the screen cloth throughout fabrication. Simple mechanical interlocking elements may be employed to tension a screen for some uses. However, such systems are expensive, complicated to assemble and adjust and have joints and cavities which are difficult to clean. Welding screen in place in a tensioned condition tends to create a lack of tension uniformity. The screen cloth between welding points is able to deform and slacken. Further, the use of a top frame element again creates joints and cavities which are difficult to properly clean, particularly if the screen is to be employed in the food processing industry.

Another structure difficult to properly tension is the bonded screen. A structural screen frame is provided which has an upper bonding surface. Screen cloth is tensioned, adhesive is placed on the bonding surface and the screen cloth is brought against the bonding surface until the adhesive is cured. Fabrication of screens in this manner have achieved proper post fabrication tension using adhesives which cure at room temperature. However, it is generally believed that adhesives perform best when, during their use, they do not operate at temperatures in excess of the cure temperature used in the bonding of the screen components. As tensioned screens find applications in a variety of uses which require elevated temperatures, bonded screens have not proven satisfactory.

To create a bonded, tensioned screen where the bonding occurs at an elevated temperature, the fabricator must overcome or ignore substantial problems. The tensioning of screen cloth becomes exceedingly difficult when the screen cloth is subjected to substantial temperature changes. Frequently used screen materials include metal screen cloth and metal screen frames. When either is heated, it expands. However, there is a vast difference between the heat transfer characteristics of screen cloth and screen frames. Screen cloth can be heated very rapidly while screen frames require substantial time and heat input. For the same reasons, screen frames cool much slower than screen cloth when placed in the same environment. As a practical matter, when placed in air, the screen cloth will immediately cool and attempt to contract to its normal dimensions. The frame on the other hand will only slowly cool and remain expanded long after the screen cloth has attempted to contract. Thus, if adhesives are cured at elevated temperatures in the fabrication of screens, the screen cloth is likely either to relax once heat is removed or to exceed the yield strength and permanently deform. In either instance, the resulting screen assembly lacks the appropriate tension and ma suffer from other defects. A screen which is not properly tensioned can have buckled or sagging screen cloth. Buckling can cause poor flow of material being screened. Sagging inhibits transfer of vibrational energy and promotes fatigue failure.

Certain bonded screens have been fabricated with the bonding occurring at an elevated temperature. Thermal stress problems have been avoided in these instances by only heating the adhesive and an overlying ring. In such situations, the frame material is a poor thermal conductor, typically fiberglass. Adhesives, a tensioned screen, and a ring are positioned on the frame. Heat is then directly applied to the overlying ring until the adhesive is cured. Under these circumstances, the screen frame and the screen cloth ar effectively not heated. In this way, thermal stresses between the two is avoided.

In addition to the foregoing, tensioned screens have found substantial utility in the food processing industry. Substantial requirements are placed on products in this industry. No toxic materials may be employed, the resulting products must be easy to clean and the products must not interact with the substances being processed. Many tensioned screen designs have difficulty meeting these requirements because of the selection of materials and adhesives or because of the creation of cavities and joints which are not easily cleaned. Abrasion and bond deterioration under heat can specifically affect bonded screens in use.

SUMMARY OF THE INVENTION

The present invention is directed to apparatus for the making of tensioned screens. The screens are bonded under tension at an elevated temperature in a process and apparatus which allows the resulting product to be properly tensioned for subsequent use. A screen cloth heating system and a screen frame heating and cooling system may be used to provide for proper tensioning and stress control of the screen cloth for a well tensioned final product. Elevated temperatures are employed for the curing of adhesive to enhance the resultant product structure and capabilities.

In a further aspect of the present invention, the apparatus for fabricating screen assemblies may include mechanisms for providing the proper heat profile to the components being assembled and for accommodating thermal expansion of the assembly during the fabrication process. A sheet heater may be employed adjacent to and roughly coextensive with the screen cloth inwardly of the screen frame for proper expansion of the screen cloth. Heating elements may be employed in direct contact or in close proximity with the screen frame for creating the appropriate bonding temperature for the adhesive. Resilient mechanisms may be employed for maintaining proper screen tension and for providing appropriate compression force between the screen frame and screen cloth at the bond. Air blowers may be used to selectively cool portions of the final assembly for reduced processing time.

The construction of the screen and the selection of materials in keeping with the practice of the present invention lend themselves to providing a structure with uniform tensioned screen cloth, alkali, acid and solvent resistant properties, simple and sound construction without hard-to-clean joints and cavities and materials acceptable for food processing. Accordingly, it is an object of the present invention to provide an improved final tensioned screen product through its materials, process and apparatus of manufacture. Further objects and advantages will appear hereinafter.

BRIEF DESCRIPTION OF THE DRAWINGS

FIG. 1 is a side view of an adhesive application station.

FIG. 2 is a cross-sectional side view of a screen frame with adhesive and elastomer positioned thereon.

FIG. 5 is a cross-sectional elevation of a portion of a screen cloth tensioning frame.

FIG. 6 is a cross-sectional side view of a portion of heating elements and the mounting therefor.

FIG. 7 is a perspective view of a completed screen assembly.

DETAILED DESCRIPTION OF THE PREFERRED EMBODIMENT

Figure 3:
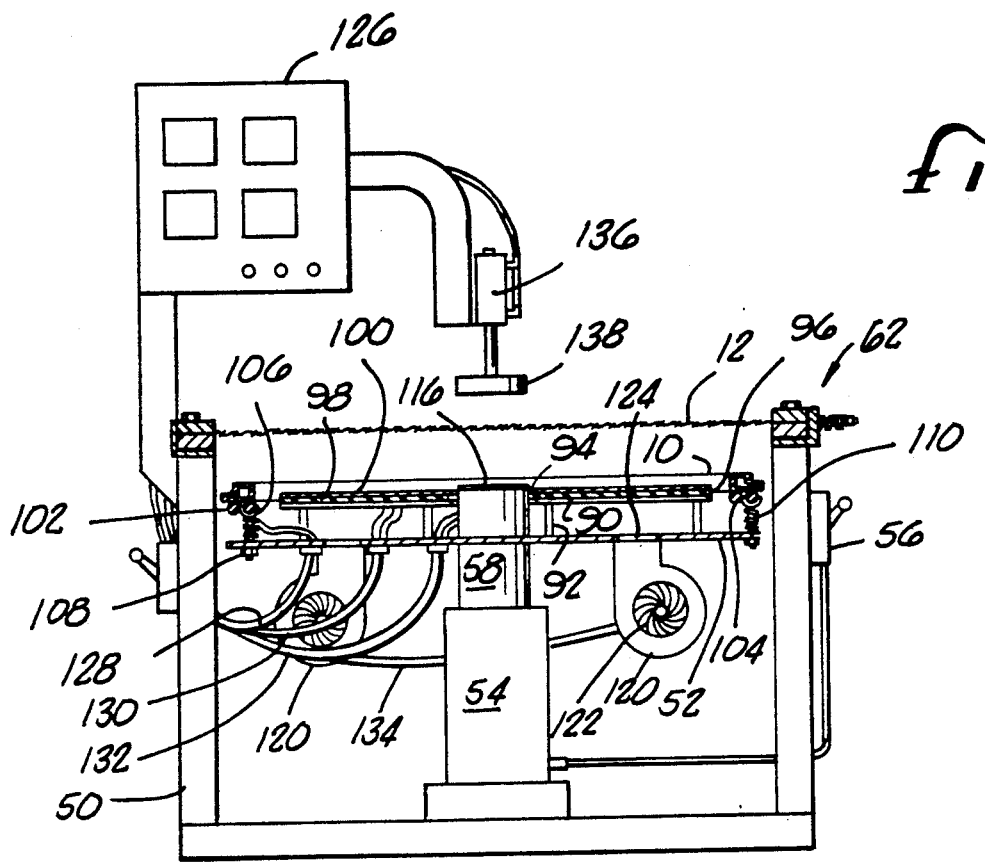
FIG. 3 is a side view of a screen assembly station with the screen frame displaced from the screen cloth.

Turning in detail to the drawings, FIG. 7 illustrates an assembled tensioned screen including a rigid screen frame 10 and screen cloth 12 bonded to the screen frame 10 in tension. A center disc 14 may be used and is shown positioned on and bonded to the middle of the screen cloth 12. The center disc 14 includes two disc elements, one on either side of the screen. These elements are bonded by adhesive through the screen. A rubber gasket or room temperature cured elastomeric material may be positioned at the periphery of the two disc members to both retain the bonding adhesive between the two disc members during curing and to seal any cracks or cavities in the center disc structure. The screen cloth comes in a wide variety of screen patterns and mesh sizes and is, in the preferred embodiment, most commonly of stainless steel. Nylon, polyester and other synthetic materials are also used. The screen frame 10 itself, like the screen cloth 12, is generally conventional with an upper surface 16 forming a bonding surface for association of the screen cloth 12 in bonded relationship therewith. The screen frame 10 is preferably of fabricated stainless steel sheet forming a tubular structure which is sealed. Non metallic materials and solid construction may also be used.

The process for manufacturing screens of the present invention is shown in this embodiment to employ a screen frame 10 which is circular in plan. However, depending on the screening equipment, rectangular or other shapes may also be employed. The screen frame is prepared with particular attention to the creation of an appropriate bonding surface 16. To this end, the frame is thoroughly cleaned with solvent. Additionally, the bonding surface is grit blasted to a degree of roughness which can provide optimum adhesion of the adhesive material. Quite naturally, the optimum roughness will depend on the nature of the frame material, adhesive and screen cloth. In the preferred embodiment, a roughness of around 63 micro inch to 125 micro inch has been found optimal. Following the grit blasting, and preferably just prior to assembly of the screen, the screen frame 10 is once again cleaned with solvent. Thus, a cleaned and roughened surface is presented for the bonding operation.

Once properly prepared, the screen frame 10 is placed on a turntable 18 shown in FIG. 1. The turntable 18 may be hand operated or motor driven. Such a turntable is employed with circular screen frames. Other carriages or the like would be appropriate for rectangular screen frames. A frame 20 supporting the turntable 18 is also shown supporting a second turntable 22. The second turntable 22 is shown to have a screen frame 10' of smaller diameter. In this way, a multiple number of screen frame diameters may be accommodated.

Associated with the turntables 18 and 22 is a mounting stand 24 fixed to the frame 20. The mounting stand 24 supports an adhesive dispenser. The adhesive dispenser includes a hollow nozzle 28 and a mixing chamber 30. The mixing chamber 30 is in fluid communication with the nozzle 28 as are two conduits 32 and 34. The conduit 32 conveys material from a first reservoir 36 while the conduit 34 conveys material from a second reservoir 38. The material in each of the reservoirs is preferably placed under pressure and appropriately valved to be conveyed through the conduits 32 and 34 in the selected ratio to the mixing chamber 30. By providing the appropriate pressure and nozzle characteristics for the adhesive employed, an even flow of material may be dispensed through the nozzle 28 onto a screen frame on one of the turntables. Through adjustment of the speed of the turntable 18 and the flow of material from the nozzle 28, a bead of adhesive 39, shown in the cross section of FIG. 2, may be deposited on the bonding surface 16 of the screen frame 10. Most conveniently the bead 39 is placed centrally on the bonding surface 16. Depending on the desired final product or the flow characteristics of the adhesive, the bead 39 may be deposited either inwardly or outwardly of the center of the bonding surface 16. A dispenser 40 is also mounted to the mounting stand 24. The second dispenser 40 includes a nozzle 42 appropriately directed to the inner edge of the screen frame 10. A conduit 44 conveys pressurized, unvulcanized elastomer from a reservoir 46. Again, by selecting the proper speed of the turntable 22 and nozzle configuration, the proper sized unvulcanized elastomer bead 48 may be deposited.

The adhesive bead 39 is shown to be placed centrally on the bonding surface 16. The unvulcanized elastomer bead 48 is positioned adjacent to the adhesive bead 39 at the inner edge of the screen frame 10 A similar elastomer bead may also be placed at the outer edge of the screen frame 10. One advantage of doing so is to create an adhesive cavity between the two elastomer beads. Sufficient adhesive 39 is positioned on the bonding surface 16 such that it will appropriately cover the bonding surface and extend into and through the screen cloth 12 when positioned on the screen frame 10.

The unvulcanized elastomeric bead 48 provides an initial function during fabrication of a screen to keep the adhesive 39 from flowing to the inner edge of the bonding surface 16. As has been long recognized, hard bonding materials or other rigid retaining devices are inappropriate for placement at the inner edge of a screen frame 10. Further, an elastomer is preferably located at such an inner edge to provide a transition for the screen cloth 12 in the final screen. Regardless of how taut the screen cloth may be, when used in a vibratory device, the screen cloth will vibrate in directions normal to the plane of the screen frame 10. If the transition between the unbonded and bonded screen cloth areas is rigid, high stress exists at that point and fatigue failure can occur. With an elastomer providing a transition between the unbonded screen cloth and the bonded screen cloth, the point of high stress is dissipated across the elastomer and fatigue failure is less likely.

Figure 4:
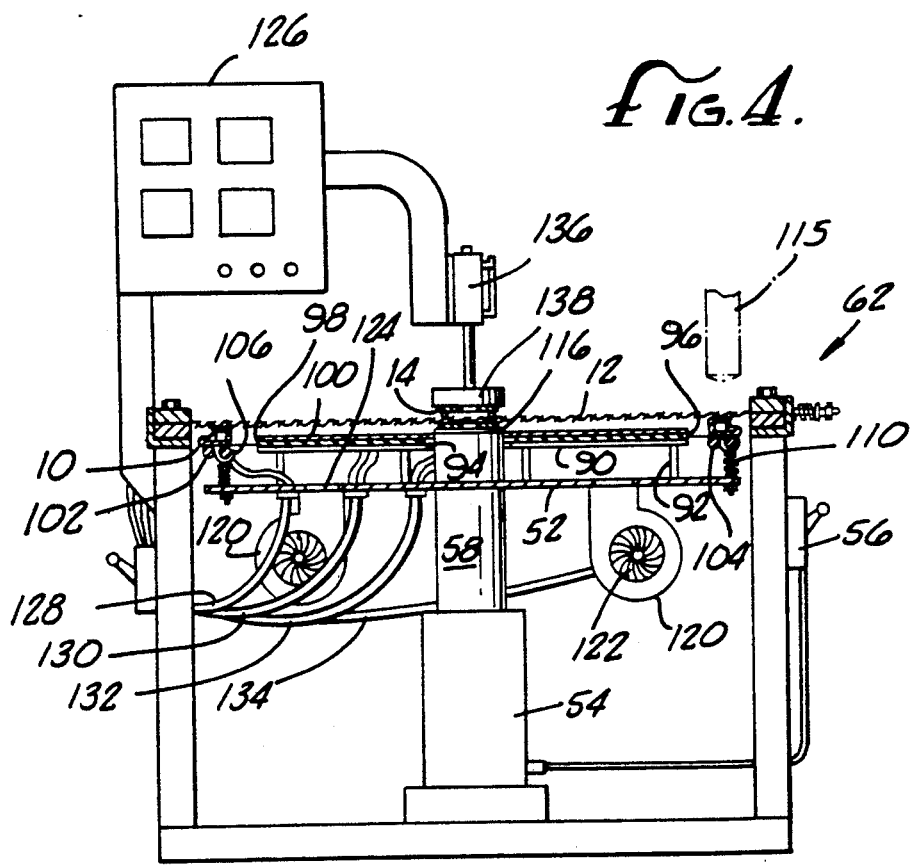
FIG. 4 is a side view of the same screen assembly station with the screen frame in contact with the screen cloth.

Once the adhesive bead 39 and the unvulcanized elastomer bead 48 are formed on the screen frame 10, the screen frame 10 is taken to a screen frame assembly station. The screen assembly station is shown in the preferred embodiment in FIGS. 3 and 4 to include a support frame 50. The support frame 50 accommodates a platform and a screen cloth tensioning frame along with the requisite controls. The platform includes a lift table 52 which is shown to include an air or hydraulic cylinder 54. The cylinder is controlled by a conventional valve control mechanism 56 to lift a piston structure 58. The lift table 52 is conveniently planar and is fixed to the piston structure 58 at its center. When employed with circular screens, the lift table 52 may also be circular. The cylinder 54 is arranged to present two limit positions of the lift table 52. A first limit position is shown in FIG. 3. This first position has the lift table 52 and all equipment mounted thereon in a retracted position at the lower end of the stroke of the cylinder 54. A second extreme position is illustrated in FIG. 4 with the lift table 52 raised to a second limit. Typically the heater for the screen cloth will be placed closer than illustrated; however, the spacing depicted provides clarity of illustration.

Also supported by the support frame 50 is a screen cloth tensioning frame, generally designated 62. The screen cloth tensioning frame 62 is conveniently formed in a rectangular or square configuration, the construction of which can best be seen in FIG. 5. The frame 62 includes frame members 64 which each have a guide surface 66 and a mounting flange 68. The mounting flange 68 is located on the outer side of the frame member 64 with the guide surface 66 inwardly thereof. Positioned on each of the frame members 64 is a tensioning rail 70. The tensioning rail 70 includes an upper member 72 and a lower member 74. The members 72 and 74 are brought together by bolts 76 which act to compress and grip screen cloth 12 positioned between and define the plane of the screen cloth tensioning frame. Thus, a screen may be gripped on all four sides by tensioning rails 70 and held with sufficient strength such that the screen may be tensioned as desired.

To resiliently hold the tensioning rails 70 in tension, resilient elements are provided. These elements may take the form of springs or pneumatic elements. In the preferred embodiment, each of the four sides of the screen cloth tensioning frame 62 are provided with tensioning studs 78. The tensioning studs 78 are threaded into the lower member 74 and extend through holes 80 in the mounting flange 68. The outer end of each tensioning stud 78 is also threaded to receive a tensioning nut 82. Positioned on each tensioning stud 78 between the mounting flange 68 and the tensioning nut 82 is a coil spring 84. Mounting collars 86 and 88 are positioned at the ends of the coil spring 84 and in turn extend against the mounting flange 68 and the tensioning nut 82. By tightening the tension nut 82 on the tensioning stud 78, the spring 84 is compressed. This pulls the tensioning stud 78 through the mounting flange 68 to draw the tensioning rail 70 outwardly. By selecting a spring of sufficient length and rate, a resilient mounting is provided which can accommodate expansion and contraction of the screen cloth and maintain roughly the same tension on the screen cloth.

The desirable tension to be achieved in the final product approximates the tension introduced into the screen cloth 12 when first placed in the screen cloth tensioning frame 62. Through empirical results and adjustments to the heating cycles, an optimum preassembly tension may be introduced to the screen cloth 12 in the screen cloth tensioning frame 62. The ultimate tension in the completed screen preferably approaches the maximum permissible screen tension recommended by the screen cloth manufacturer.

Returning to the components positioned on the lift table 52, a sheet heater is mounted thereto with an insulated plate 90 positioned above and spaced from the table 52. To space the insulated plate 90 from the table 52, spacing bolt assemblies 92 are employed at both the inner circular edge 94 and the outer circular edge 96 of the insulated plate 90. Thus, for reasons which will become apparent, air may blow through the space beneath the insulated plate 90 and above the lift table 52. Positioned on the insulated plate 90 is a heating blanket 98. The heating blanket is typically of vulcanized silicone material with heating coils extending therethrough. The heating blanket 98 has roughly the same area in plan as the insulated plate 90 upon which it sits. On top of the heating blanket 98 is an aluminum plate 100. The aluminum plate 100 is designed to evenly disperse the heat from the heating blanket 98 such that the overall assembly presents a uniform source of heat across the requisite area to operate as a sheet heater. Thus, empirical observation may be conveniently used to define the appropriate thickness of the aluminum plate 100 such that it heats quickly to expedite the cycle and yet is of sufficient thickness to adequately disperse the heat of the coils in the heating blanket 98.

Positioned radially outwardly of the sheet heater are two heating elements 102 and 104. These elements 102 and 104 extend just outwardly of the periphery of the sheet heater at a diameter to accommodate the screen frame 10. Each of the heating elements 102 and 104 is mounted in a plurality of mounting clips 106 as best illustrated in FIG. 6. The mounting clips may conveniently be eye-bolts with the top portion of the circular head cut off to accommodate the heating element. Lock nuts 108 are positioned below the lift table 52 and fixedly threaded on the mounting clips 106. A compression spring 110 with mounting collars 112 and 114 at either end is positioned on each shaft of each mounting clip 106. The mounting clips 106 are located in this fashion about the lift table 52 with the clips of each of the two heating elements 102 and 104 being staggered in their position so as not to interfere with one another. Insulation may or may not be provided between the clips in the heating elements depending on the elements and the performance requirements. As can be seen in FIGS. 3 and 4, the screen frame 10 rests directly on the heating elements 102 and 104 for rapid heat conduction into the screen frame. Indirect heating may also be used. The resilient mounting of the heating elements 102 and 104 also allows the screen frame 10 positioned thereon to be resiliently placed for its later interaction with the screen cloth 12 during bonding. Alternatively, heat lamps for example, illustrated in phantom as 115, may be employed where the screen frame is non conductive or requires an uneconomical length of time to heat sufficiently.

Centrally located on the lift table 52 is a center disc heater 116. This heater may be a simple heating coil in association with a plate.

Also associated with the lift table 52 four blowers 1200 Four such blowers are found in the preferred embodiment. The blowers 120 include intakes 122 located below the lift table 52. The blower exhausts 124 are directed into the space between the lift table 52 and the insulated plate 90. Flow from these blowers is thus primarily directed outwardly to the area of the heating elements 102 and 104 and any screen frame 10 positioned thereon. The nature of the insulated plate 90 prevents the blowers from affecting the temperature of the heating blanket 98 or aluminum plate 100 and in turn the screen cloth 12.

Also mounted to the support frame 50 is a microprocessor based temperature controller 126. The temperature controller 126 controls power through conduits 128, 130, 132 and 134 to the heating elements 102 and 104, the heating blanket 98, the center disc heater 116 and the blowers 120, respectively. The control of these components will be discussed more fully in the description of the process below.

Also affixed to the support frame 50 is an air cylinder 136. The air cylinder 136 operates a piston having a broad head 138. The broad head is capable of being brought down into the plane of the screen cloth tensioning frame 62 to compress the screen cloth 12 and the two elements of the center disc 14 together using the center disc heater 116 as an anvil.

The adhesive employed for bonding in the present invention presents significant beneficial characteristics applicable to use in bonding screen cloth to a screen frame. The preferred ingredients are presented in a two-part adhesive mixture. The following constitute a preferred adhesive:

| Part A - 100 parts by weight | |
| --- | --- |
| Bisphenol F epoxy resin | 56.85% wt. |
| Silicon dioxide in the form of amorphous silica | 32.76% wt. |
| Titanium dioxide | 6.90% wt. |
| Fumed silicon dioxide (precipitated SiO₂ may also be used at twice the amount of the fumed SiO₂) | 3.17% wt. |
| Glycerin | 0.32% wt. |
| Part B - 16.5 parts by weight | |
| Amine adduct hardener | 100% wt. |

Naturally, a range of the proportions of the foregoing ingredients may provide the same or selected characteristics of the bond. The epoxy resin is considered by the FDA as suitable for food contact when properly formulated and cured and may be advantageously cured at an elevated temperature. When employed in the adhesive, this resin is highly chemically resistant, due in part to substantial cross linking. The practical range for this resin by weight percent in part A of the adhesive is about 38.5% wt. to 68.5% wt. As the change in the percent amount of resin is largely accommodated by a change in the percent amount of the amorphous silica, mixtures at the higher end of this range are very fluid and at the lower end are very viscous.

The amorphous silica presents improved chemical resistance to the bond such that the bond is substantially inert in most applications presently known where the screen itself is also not chemically reactive. The silica also contributes to advantageous flow control for placement of the bead 39 on the screen frame 10 and for flow of the adhesive through the screen cloth 12 when the screen frame 10 and screen cloth 12 are brought together. The silica particles have been found to improve bonding; although the specific mechanism for such improvement is not fully understood. The effect has been noticed with the finer mesh sizes of screen cloth. It may be that the amorphous silica particles hold the screen cloth 12 away from the screen frame 10 to some very small degree such that the thickness of the bond can be advantageously increased. The particle size for the silica which has been used in the preferred embodiment with success fits the following profile:

Amorphous grain size

| | |
| --- | --- |
| 100% | below 15 microns |
| 99% | below 10 microns |
| 76% | below 5 microns |

Mean particle size is 2.2 microns. In the cured condition, the amorphous silica adds to the abrasion resistance of the material, which extends slightly above the screen cloth and to its chemical resistance. The amorphous silica also is believed to contribute to the coefficient of expansion such that the bond acquires a coefficient sufficiently similar to the coefficient of thermal expansion of the screen frame 10 that the bond is not deteriorated by thermal stresses in use. Crystalline silica may also be used with similar results. However, crystalline silica is very hard on the mixing equipment and, for that reason, is not preferred. The practical range for the silica in Part A of the adhesive is best understood in combination with the titanium dioxide. The range for both inert ingredients together is about 30% wt. to 60% wt.

The titanium dioxide contributes opacity to the bond, making it an opaque white. This inert ingredient may be replaced by either amorphous silica or by another inert pigment.

The fumed silica, or alternately the precipitated silica in twice the percent weight, contributes flow control, viscosity and an appropriate thixotropic index. Flow control and the thixotropic index are also effected by the glycerin. With the foregoing ingredients affecting flow control, a number of advantages are realized. A proper bead is created on the upper surface of the screen frame. The adhesive material 39 properly passes through the screen cloth 12 while leaving a bond thickness between the screen frame 10 and the screen cloth 12 understood to be due principally to the amorphous silica. The material 39 also properly knits together on top of the screen cloth 12 to form an appropriate adhesive structure in the cured state. The practical range for fumed silica is about 0.5% wt. to 4.0% wt. while the range for precipitated silica is about 1.0% wt. to 7.0% wt. The range for the glycerin is about 0.1% wt. to 1.0% wt. The fumed or precipitated silica works synergistically with the glycerin to create appropriate thixotropic properties.

The amine adduct, also known as modified aliphatic polyamine, is presented as the second part of the adhesive. This epoxy resin hardener is mixed at 16.5 parts by weight for 100.0 parts per weight of the first part of the adhesive. A suitable such hardener is sold under the trade name "Ancamine 1916" by Pacific Anchor Chemical Corp. of Los Angeles, Calif., which is a reaction product of diethylene triamine (DETA) and a bisphenol-A epoxy resin. Looking to the range of proportions for resin set out above, the hardener should be understood to have a proportional range, to the amount of resin. Therefore, the hardener would have a range of about 10 to 20 parts per 100 parts of Part A of the adhesive by weight. As with all of the aforementioned components, this hardener is considered by the FDA as suitable for food contact when properly formulated and cured.

Turning to the process of fabricating a tensioned screen on the screen assembly station, a length of screen cloth 12 of a selected material is positioned in the screen cloth tensioning frame 62 by gripping the edge of the screen cloth 12 by the tensioning rail 70. Once the upper and lower members 72 and 74 are brought into compressed relationship about the screen cloth 12 by the bolts 76, the screen cloth 12 may be tensioned. To do so, tensioning nuts 82 are tightened to achieve a preselected amount of tension. The tension is such that, through experience, it will result in the desired final tension within the screen cloth 12 when associated with the screen frame 10. Typically in the preferred process, the tensioning of the screen is performed prior to placement of the adhesive and elastomer on the screen frame.

Once the adhesive bead 39 and the unvulcanized elastomer bead 48 are positioned on the screen frame 12, the lower member of the center disc 14 is placed on the center disc heater 116 and the screen frame 10 is placed on the heating elements 102 and 104.

Once positioned on the lift table 52, and more specifically on the heating elements 102 and 104, the screen frame with uncured adhesive 39 and unvulcanized elastomer 48 is positioned for assembly with the screen cloth 12 located and tensioned in the screen cloth tensioning frame 62. The lift table 52 is shown to be driven by an air cylinder. A hydraulic cylinder could also be employed or equivalent mechanical means. The lift table is shown in its lowered position in FIG. 3 and is shown in its upper, extended position in FIG. 4. With the screen frame 10 in position, the lift table may be raised to its upper position to assemble the screen cloth 12 with the screen frame 10.

At its upper position, the lift table 52 is positioned such that the aluminum plate 100 atop the heating blanket 98 forming the sheet heater approaches but preferably does not contact the underside of the screen cloth 12. If the sheet heater were to contact the screen cloth, the process would also work. However, it is likely that the screen cloth would be discolored by the heat.

The screen frame 10 sitting upon the heating elements 102 and 104 is brought into pressurized contact with the screen cloth 12. The lower element of the center disc 14 may also be brought into contact with the screen cloth 12. The resilient mountings on the heating elements 102 and 104 cause the screen frame to come into uniform contact with the screen cloth 12 and provide a substantially constant pressure of the screen frame 10 against the screen cloth 12. This pressure forces the adhesive bead 39 up through the screen mesh to immerse an annular portion of the screen cloth 12 in the adhesive 39 at the bond surface of the screen frame 10.

The screen frame 10 is heated by the heating elements 102 and 104. The contact between the heating elements 102 and 104 and the metallic screen frame 10 provides for rapid heating to expedite the entire process. Where the screen frame 10 is not of conductive material, an array of heat lamps or other conventional heating mechanisms would be employed to elevate the temperature of the adhesive 39 to a proper cure temperature.

With the heating elements 102 and 104, a ramp/soak cycle is employed controlled by the temperature controller 126. Such a heating procedure would bring the temperature of the coils up to a specified temperature above the target temperature. At this point, the temperature is lowered to the target temperature and maintained at that temperature. Consequently, a first surge of heat is distributed to the screen frame 10 to bring the screen frame 10 quickly up to an appropriate temperature. After the target temperature is approached, a steady state temperature is maintained by the heating elements 102 and 104. In the preferred embodiment, the target temperature is between 150° F. and 300° F. with a cycle time of 20 minutes. The performance of the adhesive will dictate the actual time and temperature conditions. At the end of the cycle, the heating elements 102 and 104 are turned off.

The screen cloth is also heated using the sheet heater immediately adjacent to the screen but slightly spaced therefrom. The heating blanket 9 is controlled by the temperature controller 126 to raise the temperature of the screen cloth to a range of 150° F. to 300° F. As the temperature of the screen cloth is raised, the screen cloth expands. The tension on the screen cloth is maintained even with this expansion due to the resilient elements associated with the screen cloth tensioning frame 62. The heating of the screen frame 10 and the screen cloth 12 are conducted in such a manner that they expand to roughly the same extent. In this way, when the bond is complete and the screen assembly cooled, it will maintain the desired uniform tension in the screen cloth 12. Prior to curing of the adhesive, the frame and screen can experience some relative movement. Care must be taken to avoid too much relative movement between these components as it would spread the adhesive or elastomer beyond appropriate limits on the screen frame 10.

The heating of the screen frame 10 only moderately affects the action of the unvulcanized elastomer. Typically, silicone is employed which is room temperature vulcanizing. Thus, the vulcanizing commences with the deposition of the inner bead 48 and is accomplished over a several hour period, completed long after the screen cloth 12 has been bonded to the screen frame 10.

Once the heating elements 102 and 104 have completed their cycles, the screen frame begins to cool. This cooling is enhanced by the blowers 120 which direct air into the space between the lift table 52 and the insulated plate 90. This forced air moves outwardly to blow over the screen frame 10 for cooling. With this cooling, the screen frame 10 contracts. The screen cloth 12 is of a structure that must be assumed to cool almost instantly. Once heat is removed from the screen cloth, temperature falls very rapidly which in turn results in contraction of the screen cloth. If the screen frame 10 cools slowly and the screen cloth 12 cools rapidly, the tension in the screen cloth will increase to jeopardize both the bond and the integrity of the screen cloth itself If the yield point of the screen cloth is reached, the screen will stretch permanently and tension will be lost when the screen assembly is cooled. Consequently, heat is preferably maintained in the sheet heater assembly such that the screen cloth 12 does not contract faster than the screen frame 10. If the screen cloth 12 is allowed to contract at a slower rate, tension is lost momentarily in the screen cloth. However, once the screen cloth is then cooled to the temperature of the screen frame 10, tension is restored. Thus, it is preferred that the sheet heater assembly is either left on or contains sufficient latent heat that the screen cloth 12 does not cool faster than the screen frame 10.

During the process of heating the screen cloth 12 and screen frame 10, the center disc is also bonded to the screen. With the lift table 52 in the raised position, the lower element of the center disc 14 is properly placed in the center of the screen. The center disc heater 116 is simply left on at all times at the appropriate temperature for bonding of the adhesive. A gasket or bead of elastomer is placed at the periphery of the disc and a cup of adhesive is poured onto the screen cloth above the lower disc element. The upper disc element is then positioned and held in compression by the head 138 until bonding occurs.

Once bonding is complete and the screen is properly cooled, the lift table is lowered and the bonded screen is removed. The excess screen cloth extending beyond the periphery of the screen frame 10 is cut off and the outer edge is ground to a smooth surface. If the tension is appropriately maintained, the screen is ready for use once the elastomer has cured.

Thus, an improved screen product along with the adhesive process and apparatus for the manufacture thereof are disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A screen assembly station for bonding screen cloth to screen frames, comprising
   a screen cloth tensioning frame;
   a platform including a central sheet heater and a peripheral heater extending about said central sheet heater;
   A support for holding a screen frame and cooperating with said screen cloth tensioning frame to selectively bring into contact screen cloth in said screen cloth tensioning frame and a screen frame in said support;
   control means for separately controlling the temperatures of said central sheet heater and said peripheral heater.

2. The screen assembly station of claim 1 wherein said peripheral heater includes said support for holding a screen frame.

3. The screen assembly station of claim 1 wherein said central sheet heater is circular and said peripheral heating element is positioned adjacent the outer periphery of said circular central sheet heater.

4. The screen assembly station of claim 1 wherein said platform includes a lift table support, said central sheet heater and said peripheral heating element, said central sheet heater being spaced from said table, and a blower having an outlet to between said table and said central sheet heater.

5. The screen assembly station of claim 4 further comprising additional said blowers.

6. The screen assembly station of said 1 wherein said central sheet heater includes a heater sheet with heating elements embedded therein, an insulated plate upon which said heater sheet is positioned and a heat conducting sheet positioned on said heater sheet, said insulated plate, said heater sheet and said heat conducting sheet being substantially coextensive.

7. The screen assembly of claim 1 wherein said platform includes resilient mounting assemblies supporting said peripheral heating element, said mounting assemblies being resilient in the direction toward and away from the plane of said screen cloth tensioning frame.

8. A screen assembly station for bonding screen cloth to a screen frame, comprising
   a screen cloth tensioning frame;
   a platform including a central sheet heater and a peripheral heating element extending about said central sheet heater;
   a support frame for supporting said screen cloth tensioning frame and said platform between a first position with said screen cloth tensioning frame displaced from said platform and a second position with said screen cloth tensioning frame adjacent said platform.

9. The screen assembly station of claim 8 wherein said screen cloth tensioning frame includes a tensioning rail resiliently held to said tensioning frame and having means to grip screen cloth.

10. The screen assembly station of claim 8 wherein said central sheet heater is circular and said peripheral heating element is positioned adjacent the outer periphery of said circular central sheet heater.

11. The screen assembly station of claim 8 wherein said central sheet heater is adjacent but not in the plane of said screen cloth tensioning frame with said support frame in said second position.

12. The screen frame assembly station of claim 8 wherein said peripheral heating element extends to adjacent the plane of said screen cloth tensioning frame such that a screen frame placed on said peripheral heating element extends to the plane of said screen cloth tensioning frame with said support frame in said second position.

13. The screen assembly station of claim 8 wherein said platform includes a lift table positioned on said support frame and supporting said central sheet heater and said peripheral heating element, said central sheet heater being spaced from said table, and a blower having an outlet to between said table and said central sheet heater.

14. The screen assembly station of claim 13 further comprising additional said blowers.

15. The screen assembly station of claim 8 wherein said central sheet heater includes a heater sheet with heating elements embedded therein an insulated plate upon which said heater sheet is positioned and a heat conducting sheet positioned on said heater sheet, said insulated plate, said heater sheet and said heat conducting sheet being substantially coextensive.

16. The screen assembly station of claim 8 wherein said platform includes resilient mounting assemblies supporting said peripheral heating element, said mounting assemblies being resilient in the direction toward and away from the plane of said screen cloth tensioning frame.

17. A screen assembly station for bonding screen cloth to a screen frame, comprising
   a screen cloth tensioning frame;
   a platform including a central sheet heater and a peripheral heating element extending about said central sheet heater, wherein said peripheral heating element extends to adjacent the plane of said screen cloth tensioning frame such that a screen frame placed on said peripheral heating element extends to the plane of said screen cloth tensioning frame with said support frame in said second position, wherein said central sheet heater is adjacent said screen cloth tensioning frame with said support frame in said second position;

a support frame for supporting said screen cloth tensioning frame and said platform between a first position with said screen cloth tensioning frame displaced from said platform and a second position with said screen cloth tensioning frame adjacent said platform.

* * * * *